(12) United States Patent
Shenoy (10) Patent No.: US 11,575,743 B1
(45) Date of Patent: Feb. 7, 2023

(54) PEER-TO-PEER SOFTWARE DISTRIBUTION (71) Applicant: VMWARE, INC., Palo Alto, CA (US)

(72) Inventor: Pranav Ashok Shenoy, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/468,759

(22) Filed: Sep. 8, 2021

(30) Foreign Application Priority Data

Jul. 23, 2021 (IN) .............................. 202141033154

(51) Int. Cl.
*H04L 67/1042* (2022.01)
*H04L 67/1074* (2022.01)

(52) U.S. Cl.
CPC ...... *H04L 67/1074* (2013.01); *H04L 67/1042* (2013.01)

(58) Field of Classification Search
CPC .......................... H04L 67/1074; H04L 67/1042
See application file for complete search history.

(56) References Cited

U.S. PATENT DOCUMENTS

| 9,753,676 | B1* | 9/2017 | Panda | G06F 3/1236 |
| 2012/0302204 | A1* | 11/2012 | Gupta | H04M 3/42221 |
| | | | | 455/406 |
| 2013/0166654 | A1* | 6/2013 | Hjelm | H04L 67/1046 |
| | | | | 709/204 |
| 2020/0074115 | A1* | 3/2020 | Di Pietro | H04W 12/37 |
| 2020/0351260 | A1* | 11/2020 | White | G06F 21/445 |
| 2021/0336966 | A1* | 10/2021 | Gujarathi | H04L 9/3213 |
| 2021/0351929 | A1* | 11/2021 | Palanisamy | H04L 63/104 |
| 2021/0389959 | A1* | 12/2021 | Jain | G06F 9/4451 |
| 2022/0022035 | A1* | 1/2022 | Sampson | H04W 4/80 |
| 2022/0027855 | A1* | 1/2022 | Aluvala | G06F 16/90332 |
| 2022/0030023 | A1* | 1/2022 | Soman | G06F 21/577 |
| 2022/0044569 | A1* | 2/2022 | Martin | G06Q 10/0631 |

* cited by examiner

*Primary Examiner* — Aftab N. Khan
(74) *Attorney, Agent, or Firm* — Clayton, McKay & Bailey, PC (57) ABSTRACT

Systems and methods are described for performing peer-to-peer software distribution in a Unified Endpoint Management environment. In an example, an unenrolled user device can request enrollment from an enrollment server. The enrollment server can send a list of resources to the unenrolled user device that the unenrolled user device needs based on a group that the unenrolled user device is assigned to. The unenrolled user device can send an identifier of the group to a notification server, and the notification server can respond with an ordered list of enrolled user devices that the unenrolled user device can retrieve the resources from. The unenrolled user device can request the resources from the enrolled user devices on the list until the unenrolled user device receives all the resources from the resource list. The unenrolled user device can then install the resources to complete enrollment.

17 Claims, 5 Drawing Sheets

PEER-TO-PEER SOFTWARE DISTRIBUTION

RELATED APPLICATIONS

Benefit is claimed under 35 U.S.C. 119(a)-(d) to Foreign Application Serial No. 202141033154 filed in India entitled "PEER-TO-PEER SOFTWARE DISTRIBUTION", on Jul. 23, 2021, by VMware, Inc., which is herein incorporated in its entirety by reference for all purposes.

BACKGROUND

Enterprises often use device managements systems, such as a Unified Endpoint Management ("UEM") system, to secure and control certain aspects of user devices of employees. Enrolling a user device with a UEM system typically requires numerous files to be downloaded and installed at the user device. To accomplish this, UEM systems often utilize a content delivery server or other similar server.

This method of delivering files for enrollment has various flaws and drawbacks. For example, a content delivery server must always be running, thereby increasing computing resource costs. Also, clients sometimes enroll large numbers of user devices at the same time, amounting to the thousands and tens of thousands at times. This can cause a major backlog that delays the enrollment process because the content delivery server is limited in the number of user devices it can send files to at once. The client must then wait for hours while the enrolling user devices sit in a queue waiting for the needed files. This can cause users to decide to opt out from enrolling their devices or at the very least can delay the users from using the UEM system.

As a result, a need exists for an efficient way of distributing resources in a UEM system.

SUMMARY

Examples described herein include systems and methods for peer-to-peer software distribution in a system that manages user devices, like a UEM system. In an example, a management application associated with the UEM system can be installed on a user device that a user is enrolling with the UEM system. The user can input credentials into the management application to initiate an enrollment process. The credentials, or at least a user identifier ("ID"), can be assigned to one or more groups within an organization, such as marketing, support, development, and management. Each group can have a corresponding group ID that has a set of associated UEM resources. The UEM resources can include applications, configuration files for policy and security settings, and other files. To complete enrollment, the UEM system can require that the unenrolled user device install the UEM resources associated with the device's group ID. The term "unenrolled" is used synonymously with "non-enrolled" and does not connote any prior enrollment unless otherwise stated.

In an example, the management application can send the credentials in an enrollment request to an enrollment server of the UEM system. The enrollment server can use the credentials to identify the user's group ID (or IDs) and compile a list of UEM resources that the unenrolled user device needs to install to complete enrollment. The enrollment server can send the list and the group ID to the unenrolled user device.

In an example, the management application can be configured to then contact a notification server of the UEM system and send the group ID to the notification server. The notification server can collect and store network information for enrolled user devices, such as their local Internet Protocol ("IP") address and subnet. The notification server can store the network information as an ordered list. In one example, the notification server can store multiple lists that are grouped by group ID. When the unenrolled user device sends its group ID to the notification server, the notification server can retrieve the corresponding network information list and send it to the unenrolled user device.

In one example, the notification server can prioritize the network lists based on prioritization scores of the enrolled devices. The prioritization score can indicate an enrolled user device's ability to provide the UEM resources to an unenrolled user device that is enrolling. The prioritization scores can be based on a variety of factors, such as the number of resource requests already being executed, the subnet of the enrolled user device, available central processing unit ("CPU") power, available memory, available network bandwidth, and the number of UEM resources for the group ID that the enrolled user device possesses. The notification server can order the list from highest scoring to lowest scoring. In one example, the notification server can use the age of a prioritization score as a tie breaker.

In an example, after receiving the network list, the management application can cause the unenrolled user device to contact the first enrolled user device on the network list and request the UEM resources from the resource list. The first enrolled user device can either deny, accept, or partially accept the request. In one example, the first enrolled user device can partially accept the resource request when it can only provide a portion of the request resources. This can occur, for example, where the first enrolled user device does not possess all the requested resources or where at least one of the requested resources is not up to date on the first user device. In an instance where the unenrolled user device is unable to retrieve all the requested resources from the first enrolled user device, the unenrolled user device can continue down the network making resource requests until it is able to retrieve all the needed UEM resources. The unenrolled user device can then install the UEM resources to complete enrollment with the UEM system.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for performing peer-to-peer software distribution in a UEM environment. In an example, an unenrolled user device can request enrollment from an enrollment server. The enrollment server can send a list of resources to the unenrolled user device that the unenrolled user device needs based on a group that the unenrolled user device is assigned to. The unenrolled user device can send an ID of the group to a notification server, and the notification server can respond with an ordered list of enrolled user devices that the unenrolled user device can retrieve the resources from. The unenrolled user device can request the resources from the enrolled user devices on the list until the unenrolled user device receives all the resources from the resource list. The unenrolled user device can then install the resources to complete enrollment.

Figure 1:
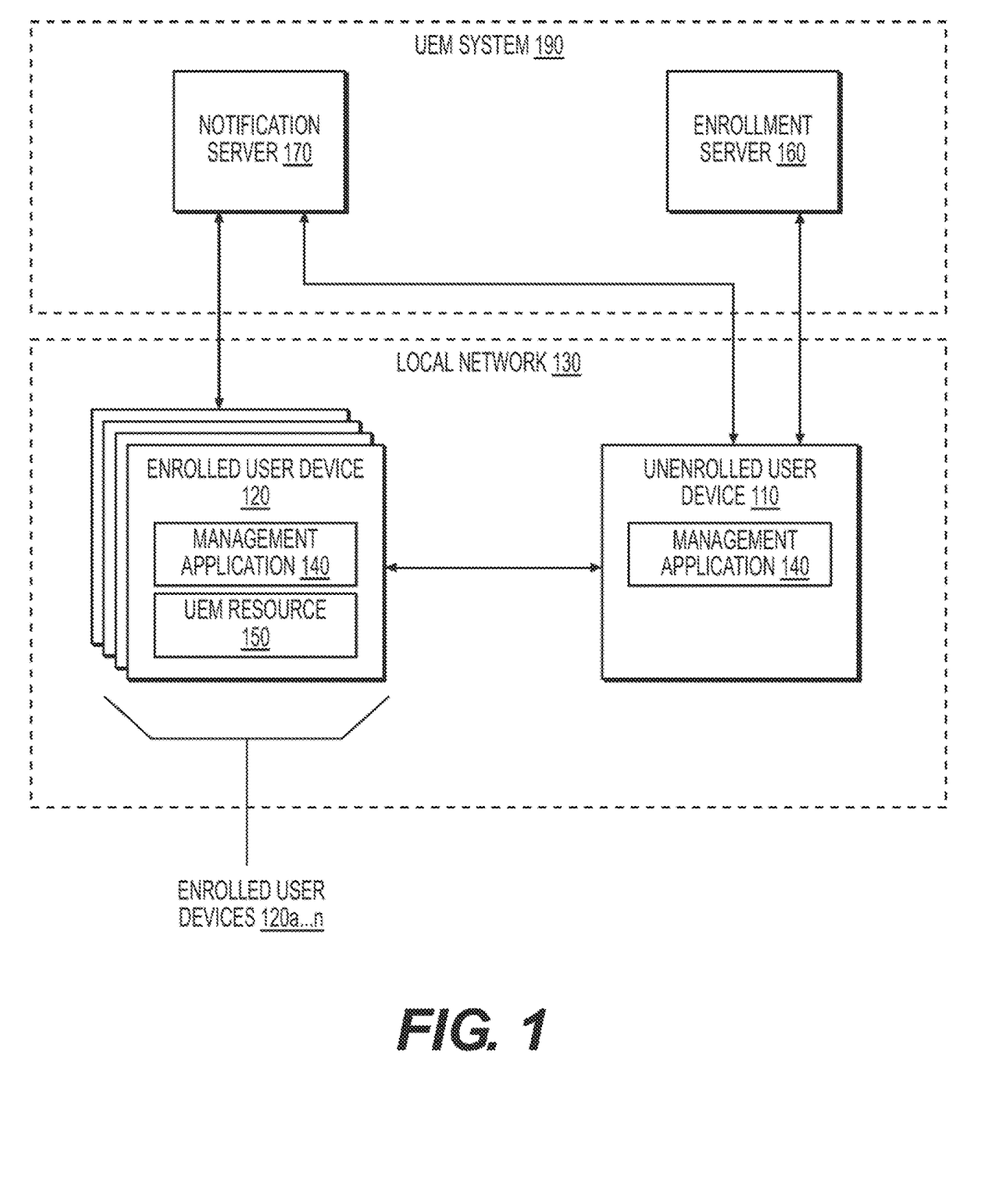
FIG. 1 is an illustration of an example system for performing peer-to-peer software distribution.

FIG. 1 is an illustration of a system for performing peer-to-peer software distribution. An unenrolled user device ("unenrolled device") 110 and enrolled user devices ("enrolled device") 120a . . . n can be connected to a local network 130. The local network can include two or more devices connected to each other such that they can exchange electronic communications. For example, the local network can include a local area network ("LAN"), a wireless local area network ("WLAN"), a virtual private network ("VPN") internet connection, or two or more devices connected directly, such as through BLUETOOTH, WIFI DIRECT, or near-field communications ("NFC"). The network can include one or more nodes, such a routers or switches, that assign IP addresses to connect devices and route network traffic to and from the connect devices.

The enrolled devices 120a . . . n can be one or more processor-based devices, such as a personal computer, tablet, or cell phone, that is enrolled in a UEM system 190 or other similar system that manages user devices for an organization. The enrolled devices 120a . . . n are referred to throughout as just the enrolled device or devices 120 and are meant to include one or more enrolled devices 120, depending on the example.

In an example, an enrollment server 160 can be a server that is responsible for unenrolled user devices in the UEM system 190. The enrollment server 160 can be a single server or a group of servers, including multiple servers implemented virtually across multiple computing platforms. In an example, the enrollment server 160, or another server in the UEM system 190, can manage enrolled user devices 120 by sending management instructions to a management application 140 installed on the enrolled user devices 120. The management application 140 can be a stand-alone application, part of an enterprise application, or part of an operating system of the enrolled devices 120.

In an example, the management application 140 can be responsible for ensuring that the enrolled devices 120 are up to date with compliance and security settings prior to accessing enterprise data and resources. The management application 140 can communicate with the enrollment server 160, allowing UEM management of the enrolled devices 120 based on compliance and security settings at the enrollment server 160. The management application 140 can enforce compliance at the enrolled devices 120, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the enrolled devices 120 can access enterprise or UEM resources through the enrollment server 160.

In an example, the unenrolled device 110 can include one or more user devices that are not enrolled with the UEM system 190. The unenrolled device 110 can, however, enroll with the UEM system 190 as part of the methods described later herein. Enrolling can cause the unenrolled device 110 to be remotely administered by the UEM system 190. In one example, the enrollment process can include installing a management agent, such as the management application 140, and installing a management profile on the unenrolled device 110. Installing the management application 140 and the management profile can grant the UEM system 190 administrative privileges over the unenrolled device 110.

Some example methods described herein include stages where the unenrolled device 110 enrolls with the UEM system 190 and then retrieves UEM resources from enrolled devices 120. In such examples, the unenrolled device 110 becomes enrolled by installing the management application 140 and a management profile, and the UEM system 190 is then granted administrated privileges over the unenrolled device 110. Although the unenrolled device 110 at that point is enrolled in the UEM system 190, it is still referred to as an unenrolled device 110 to differentiate it from the enrolled devices 120 that already have the UEM resources installed.

In an example, one or multiple servers can handle enrollment and management of enrolled devices 120. For example, the enrollment server 160 can handle enrollment and management responsibilities, or the enrollment server 160 can enroll unenrolled devices 110 and a second server, such as a management server, can administratively control the enrolled devices 120. A notification server 170 is also described later herein. In the examples described herein, any device or server that is part of the UEM system 190 can perform any function described by another part of the UEM system 190. This includes references to the UEM system 190 itself performing actions.

In an example, the enrolled devices 120 can communicate with the UEM system 190 through a pull system. For example, the UEM system 190 can store a management record specific to each enrolled device 120. This management record can include commands, configuration files, applications, and other UEM resources 150 associated with each enrolled device 120. When there is a new UEM resource 150 for an enrolled device 120, the UEM system 190 can add the UEM resource 150 to a command queue for the enrolled device 120. The UEM system 190 can then send a message to the notification server 170 that causes the notification server 170 to send a message to the enrolled device 120 to check in with the UEM system 190. After receiving the message, the enrolled device 120 can send a message to the UEM system 190 asking if there is anything the enrolled device 120 needs to retrieve. The UEM system 190 can respond by serving the UEM resources 150 from the command queue to the enrolled device 120. In one example, the UEM system 190 can send a Uniform Resource Locator ("URL") of another device where the enrolled device 120 can retrieve the UEM resources 150, such as the URL for a content delivery server.

In an example, for new user devices that are enrolling with the UEM system 190, like the unenrolled device 120, the unenrolled device 110 can be directed to the enrolled devices 120 to retrieve UEM resources 150 from the command queue. For example, each user can have a management profile that is assigned to one or more groups, such as marketing, support, development, and management. Each group can have a corresponding group ID. When enrolling the unenrolled device 110, the user can input credentials for the management profile into the management application 140, which can include at least a user ID. The management application 140 can send the credentials to the enrollment server 160, and the enrollment server 160 can map the user ID to its assigned group ID or IDs. Although a management profile can be assigned to more than one group, thereby requiring the unenrolled device 110 to retrieve more than one set of UEM resources 150, for simplicity the examples herein describe management profiles assigned to one group ID.

In an example, when the unenrolled device 110 enrolls, the enrollment server 160 can provide the unenrolled device 110 with the user's group ID and a list of the resources 150 that the unenrolled device 110 needs in order to configure itself and complete enrollment. In one example, the enrollment server 160 can hash the resource list using the group ID as the hash key.

In an example, the management application 140 can include a notification service that communicates with a notification server 170. The notification server 170 can be a server in the UEM system 190 that is responsible for sending notifications to enrolled user devices 120. In an example, the notification server 170 can collect and store network information for enrolled devices 120, such as their IP address and subnet. In one example, the enrolled devices 120 can be configured to calculate a prioritization score that is based on various factors that could affect each enrolled device's 120 ability to provide the resources 150 to an unenrolled device 110. The notification server 170 can collect the prioritization scores and create an ordered list for each group ID based on the scores. The ordered list can include the network information for enrolled devices 120 assigned to the group ID. The notification server 170 can be configured to send the ordered list to the unenrolled device 110.

In an example, the unenrolled device 110 can begin requesting the resources 150 from the enrolled devices 120 on the list. When an enrolled device 120 is able to provide the resources 150, the unenrolled device 110 can download the resources 150 from the enrolled device 120. In an instance where a first enrolled device 120a cannot provide all the requested resources 150, the unenrolled device 110 can be configured to continue down the ordered list until it receives all the resources 150. The unenrolled device 110 can then install the resources 150 and complete the enrollment process.

Figure 2:
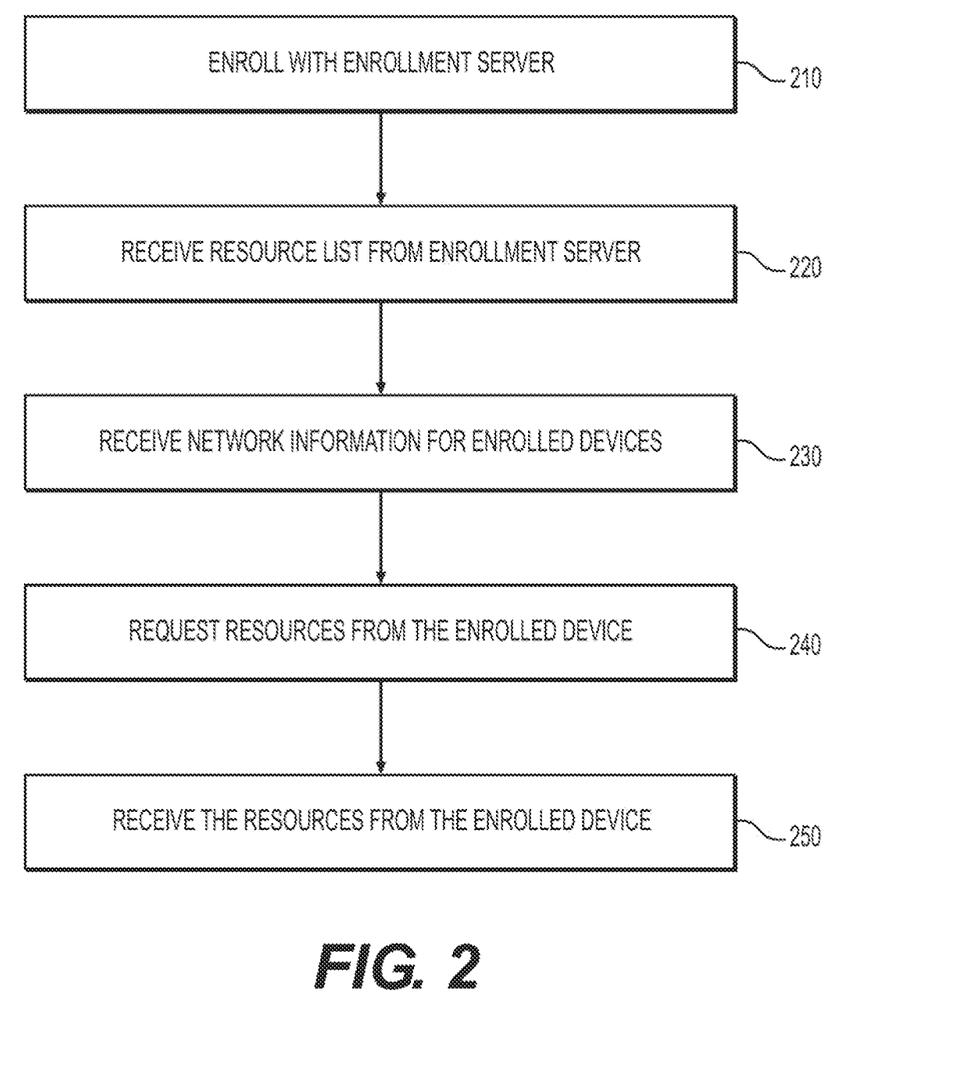
FIG. 2 is a flowchart of an example method for performing peer-to-peer software distribution.

FIG. 2 is a flowchart of an example method for performing peer-to-peer software distribution. At stage 210, the unenrolled device 110 can enroll with the enrollment server 160. For example, a user can install the management application 140 on the unenrolled device 110. When the management application 140 launches, it can check on whether the unenrolled device 110 is enrolled already. Upon determining that the unenrolled device 110 is not enrolled, the management application 140 can display a prompt for the user to enter enrollment credentials. The user can enter the credentials, which can include the user's organization email address. The management application 140 can then cause the unenrolled device 110 to send an enrollment request to the enrollment server 160, and the enrollment request can include the credentials. Other methods can also be used to send the enrollment request, such as by scanning a Quick Response ("QR") code embedded with the enrollment information, which can include a uniform resource locator ("URL") for the enrollment server 160 and credential information for enrolling the unenrolled device 110.

In an example, upon receiving the enrollment request, the enrollment server 160 can authenticate the credentials. The enrollment server 160 can also determine a group ID associated with the user's profile. The group ID can be one or multiple IDs that correspond to groups within the organization that the user is assigned to. The enrollment server 160 can use the group ID to identify the resources 150 the unenrolled device 110 needs. For example, the enrollment server 160, or another server or database in the UEM system 190, can store a table that maps group IDs to assigned commands, applications, and other resources. The enrollment server 160 can use the table to create a list of the resources 150 that the unenrolled device 110 needs.

At stage 220, the unenrolled device 110 can receive the resource list from the enrollment server 160. In one example, the enrollment server 160 can send the list as a data file, such as a hypertext markup language ("HTML"), Extensible Markup Language ("XML") file, or a JavaScript Object Notation ("JSON") file. In another example, the enrollment server 160 can send the resource list using an Application Programming Interface ("API") call with the management application 140.

In one example, the enrollment server 160 can hash the resource list with a hashing function before sending it. The enrollment server 160 can hash the entire resource list or hash each individual resource 150 on the list, depending on the example.

At stage 230, the unenrolled device 110 can receive network information related to the enrolled devices 120 that are assigned to the same group. In an example, the network information can be received from the notification server 170. For example, the unenrolled device 110 can send a resource request to the enrollment server 160. The resource request can include the group ID of the group the unenrolled device 110 is assigned to. The unenrolled device 110 can respond with the network information of enrolled devices 120 that are assigned to the same group and therefore should possess the requested resources 150.

Although examples are described throughout where the unenrolled device 110 receives the network information for enrolled devices 120 from the enrollment server 160, the unenrolled device 110 can receive the network information from any server capable of gathering network information from the enrolled devices 120. Using a notification server 170 can be advantageous because requests are frequently sent between notification servers and user devices, thereby increasing the likelihood that the network information is up-to-date.

In an example, the notification server 170 can gather network information of enrolled devices 120. The network information can include IP addresses, subnets, and group IDs, and other similar information. In one example, the notification server 170 can group the network information by group ID. For example, the notification server 170 can store the network information in a table that maps each enrolled device 120 and its network information to its corresponding group ID. In another example, the notification server 170 can store an array of network information for each group ID, as shown below:
{
group1: [{ip1, subnet}, {ip2, subnet},{ip3, subnet} . . . ],
group2: [{ip11, subnet}, {ip12, subnet},{ip13, subnet} . . . ]
}

In the example above, group1 and group2 correspond to group IDs. Group1 and group2 include pairs of network information. Each pair includes an IP address of an enrolled device 120, represented by the ip[#] entries (e.g., "ip1" and "ip11"), and a subnet associated with the IP address.

In another example, the network information array for a group can include the network information for enrolled devices 120 assigned to a parent group of the group. This can occur where the resources 150 assigned to a child group are also assigned to the parent group. As example, suppose Group A is the parent group of Group B and Group A is assigned all the resources 150 assigned to Group B. The example below represents possible network information arrays for Group A and Group B.
{
Group B: [{ip1, subnet}, {ip2, subnet},{ip3, subnet}, {ip11, subnet}, {ip12, subnet},{ip13, subnet}],
Group A: [{ip11, subnet}, {ip12, subnet},{ip13, subnet}]
}

In the example above, the pairings that include "ip1," "ip2," and "ip3" represent network information for enrolled devices 120 assigned to Group B. The pairings that include "ip11," "ip12," and "ip13" represent enrolled devices 120 assigned to Group A. As shown above, the network information array of Group B includes the three Group A devices. This is because the Group A devices will possess the resources 150 assigned to Group B. However, because Group A may be assigned additional resources 150 that are not assigned to Group B, the network information array of Group A does not include the three Group B devices.

In an example, the notification server 170 can send the network information of just a subset of enrolled devices 120 assigned to the same group as the unenrolled device 110. For example, where hundreds of enrolled devices 120 are assigned to the same group, the unenrolled device 110 may only need to contact a small number of them to obtain the resources 150 from the resource list. The notification server 170 can therefore send the network information of a limited number of enrolled devices 120 that the unenrolled device 110 can contact. If for some reason the unenrolled device 110 is unable to retrieve the resources 150 from those enrolled devices 120, the unenrolled device 110 can send another request to the notification server 170 and the notification server can send a second subset.

In an example, the notification server 170 can create the network information array as a prioritized list based on a set of factors. The unenrolled device 110 can be configured to contact enrolled devices 120 to request the resources 150 in the prioritized order. The factors can be based on characteristics that may influence the ability of an enrolled user device 120 to provide the resources 150 to the unenrolled device 110. One example factor can be based on the number of resource requests already being executed by an enrolled device 120. For example, an enrolled device 120 can be overly burdened by handling multiple resource requests from unenrolled devices 110. To prevent this, the UEM system 190 can limit the number of requests an enrolled device 120 may handle at the same time or lower the priority of enrolled devices 120 already handling resource requests, as some examples.

Some example factors can be based on available computing resources at the enrolled devices 120, such as available CPU power, available network bandwidth, available memory, and remaining battery power. For example, priority can be given to enrolled devices 120 with more available computing resources. This can help prevent enrolled devices 120 from getting overburdened by responding to resource requests from unenrolled devices 110.

One example factor can prioritize enrolled devices 120 on the same subnet as the unenrolled device 110. This can help ensure that enrolled devices 120 on the local network 130 are prioritized over enrolled devices 120 outside the local network 130, such as enrolled devices 120 that are connected through a VPN. In one example, this factor can be executed by the unenrolled device 110. For example, the unenrolled device 110 can initially skip enrolled devices 120 from the list that are not on the same local network 130. If the unenrolled device 110 is unable to retrieve the resources 150 from the enrolled devices 120 on the same subset, it can then begin to make requests to the other enrolled devices 120.

One example factor can be based on the number of resources 150 from the list that an enrolled user device 120 possesses. As an example, the unenrolled device 110 has 100 resources 150 that it needs to download. A first enrolled device 120a has 80 of the resources 150 and a second enrolled device 120b has all of them. The second enrolled device 120b can be given priority over the first enrolled device 120a because the second enrolled device 120b can provide more of the resources 150 that the unenrolled device 110 needs. If the unenrolled device 110 were to request the 80 resources 150 from the first enrolled device 120a, then the unenrolled device 110 would need to request the remaining 20 resources 150 from another enrolled device 120, such as the second enrolled device 120b or a third enrolled device 120c, which is less efficient. In one example, only updated versions of the resources 150 can be considered when determining the number of resources 150 an enrolled device 120 posses. Continuing the example above, if the first enrolled device 120a has 80 of the 100 resources 150, but 5 of the resources 150 are not up to date, then the first enrolled device 120a can be treated as if it has 75 of the resources 150 (5 less than the original 80).

In an example, prioritizing enrolled devices 120 can include calculating a prioritization score. For example, points can be assigned to factors described above, like the number of resource requests already being executed, the subnet of the enrolled device, any of the computing resource categories, the number of requested resources 150 the enrolled device 120 possesses, and any other factor deemed relevant. In one example, categories can be weighted based on their determined impact. For example, the number of available resources 150 can be given a higher weight than battery percentage. An administrator can set the factors, scoring methods, and weights, in an example.

The prioritization scores for the enrolled devices 120 can be determined by the notification server 170 or the enrolled devices 120, depending on the example. Determining the prioritization at the enrolled devices 120 may be beneficial to reduce the required computing power at the notification server 170. For example, the management application 140 on the enrolled devices 120 can calculate a prioritization score and send the score to the notification server 170, and the enrollment server can create a prioritized network information array based on the provided scores.

In an example, the enrolled devices 120 can be configured to send a prioritization score regularly, on a schedule, or upon request from the notification server 170. The enrolled devices 120 can also send their IP address and subnet, as well as any other required network information, to the notification server 170 with the prioritization score. Some information used to calculate a prioritization score is subject to sudden and frequent change, such as the information related to computing resources. For this reason, the notification server 170 can weight the scores based on how recently the prioritization score was received. As an example, a first enrolled device 120a and a second enrolled device 120b can have a matching prioritization score, but the score for the first enrolled device 120a was received before the second enrolled device 120b. The notification server 170 can give the first enrolled device 120a a higher priority based on an assumption that its score likely to be more accurate because it was received more recently. In one example, the notification server 170 can eliminate enrolled devices 120 that have not provided a prioritization score within a predetermined amount of time. For example, if a particular enrolled device 120 has not sent a prioritization score within 15 minutes, the notification server 170 can determine that the enrolled device 120 is no longer reachable by the unenrolled device 110, and the notification server 170 can remove it from the network information array.

At stage 240, the unenrolled device 110 can request resources 150 from the enrolled device 120. The unenrolled device 110 can send the request using an HTTP request or API call, as some examples. In one example, the request can include a file, such as an XML file or JSON file. In another example, the file can include a list of hashes that correspond to the resources 150 the unenrolled device 110 is requesting. In another example, the resources 150 in the list can be hashed using the group ID as the hash key. The enrolled device 120, which is assigned to the same group ID, can use the group ID to decrypt the hashed items in the list.

In an example, the enrolled device 120 can perform a check to determine whether it can send the requested resources 150. For example, the enrolled device 120 can be configured to limit the number of resource requests it can execute simultaneously or deny resource requests where computing resource parameters exceed a threshold. For example, the enrolled device 120 can be configured to deny resource requests if it is already sending resources 150 to three other unenrolled devices. This can occur, for example, where the enrolled device 120 accepts resource requests from other unenrolled devices after it sent its score to the notification server 170 but before the unenrolled device 110 sends its request. In another example, the unenrolled device 110 can deny the request if its available upload bandwidth drops below a predetermined threshold. For example, if the network connection of the enrolled device 120 suddenly weakens or the enrolled device 120 begins uploading a large file, the upload bandwidth of the enrolled device 120 may be limited. The enrolled device 120 can be configured to deny the request because another enrolled device 120 can send the resources 150 at a much faster transfer rate.

In an example, the unenrolled device 110 can begin a counter when an enrolled device 120 denies a resource request. The enrolled device 120 can be restricted from denying a resource request when the counter reaches a predetermined number. As an example, the request denial counter can have a maximum of 10. After each rejection, the unenrolled device 110 sends the counter number with the next request. The unenrolled device 110 can receive rejections from 10 consecutive enrolled devices 110a j. The eleventh enrolled device 110k would then be configured to accept the request regardless of whether other factors would cause it to normally reject the resource request.

In one example, the unenrolled device 110 and enrolled device 120 can execute an authentication handshake before the enrolled device 120 sends the resources 150. For example, the unenrolled device 110 can receive a security certificate from the enrollment server 160 that it can send to the enrolled device 120. The enrolled device 120 can authenticate the certificate before sending any data files to the unenrolled device 110.

At stage 250, the unenrolled device 110 can receive the requested resources 150 from the enrolled device 120. For example, the enrolled device 120 can send data files for the requested resources 150 over the local network 130. In one example, the enrolled device 120 can encrypt the data files before sending them, such as with an asymmetric encrypt key, a symmetric encryption key, or a cryptographic hash. In one example where an asymmetric key is used, the unenrolled device 110 and enrolled devices 120 can exchange public keys before the resources 150 are sent. In one example where a symmetric key is used, the enrolled device 120 can encrypt the resources 150 using a symmetric key that the management application 140 possesses after installation. In one example where a cryptographic hash is used, the enrolled device 120 can hash the resources 150 using a hashing function and a key known to the unenrolled device 110. For example, the hashing function can be built into the management application 140, and the enrolled device 120 can hash the resources 150 using the group ID or another key known to the management application 140. In one example, the enrollment server 160 can provide an encryption key, hashing function, or hash key that the unenrolled device 110 can use to decrypt and verify the resource files.

If the unenrolled device 110 receives all the resources 150 it needs from the enrolled device 120, then it can install the resources files and the method can end. However, in some examples the unenrolled device 110 may need to retrieve resource files from multiple enrolled devices 120. As an example, if a first enrolled device 120a can only provide a portion of the resources 150, the unenrolled device 110 can request the remaining resources 150 from a second enrolled device 120b. In one example, the first enrolled device 120a can respond to the request identifying the resources 150 it can provide, and the unenrolled device 110 can request the remaining resources 150 from the second enrolled device 120b while it is downloading resources 150 from the first enrolled device 120a.

Figure 3:
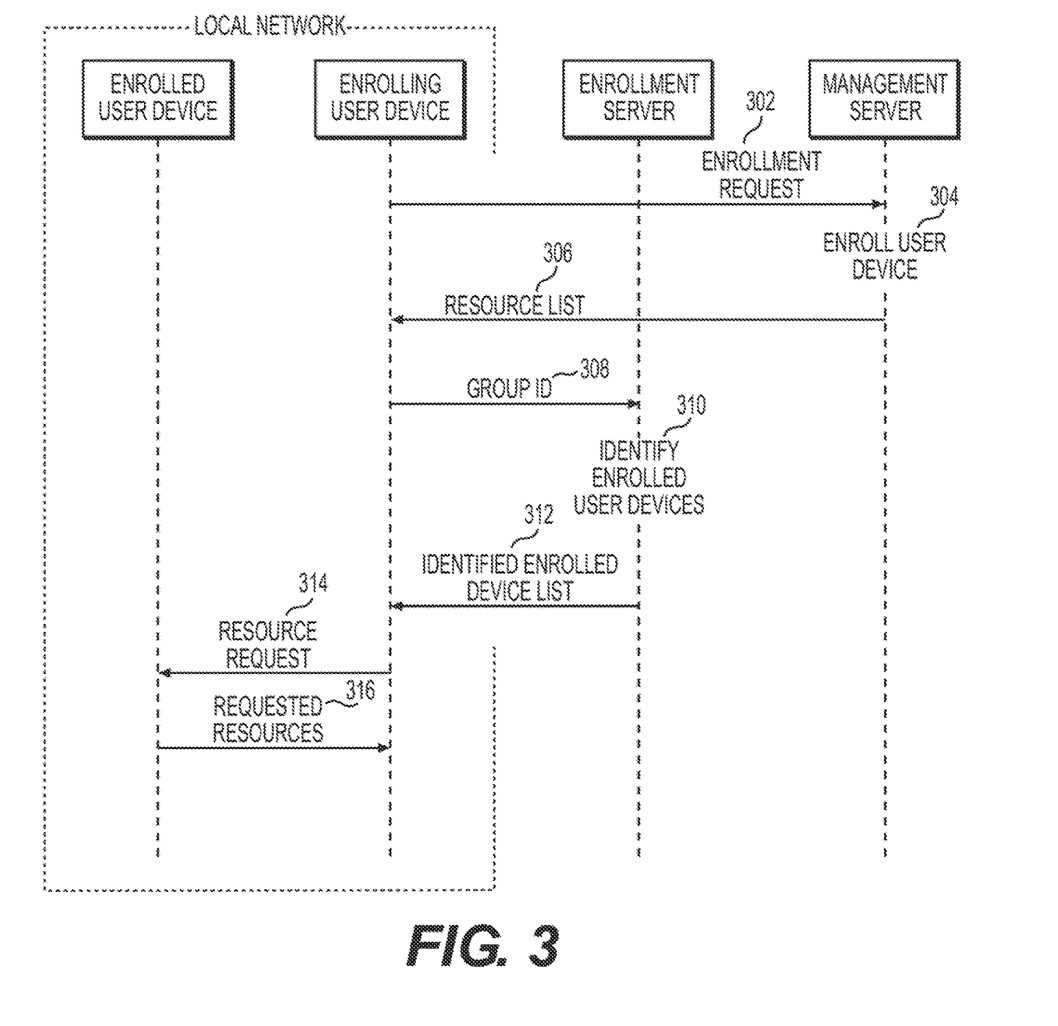
FIG. 3 is a sequence diagram of an example method for performing peer-to-peer software distribution.

FIG. 3 is a sequence diagram of an example method for performing peer-to-peer software distribution. At stage 302, the unenrolled device 110 can request enrollment from the enrollment server 160. In an example, enrollment can be facilitated on the unenrolled device 110 by the management application 140. For example, the user can launch the management application 140 on the unenrolled device 110 and the management application 140 can prompt the user to enter enrollment credentials. The user can enter the credentials, which can include the user's organization email address. The management application 140 can then cause the unenrolled device 110 to send an enrollment request to the enrollment server 160, and the enrollment request can include the credentials.

At stage 304, the enrollment server 160 can enroll the unenrolled device 110. In one example, this can include authenticating the user's credentials. The enrollment server 160 can also determine a group ID associated with the user's profile. The group ID can be one or multiple IDs that correspond to groups within the organization that the user is assigned to. The enrollment server 160 can use the group ID to identify resources 150 the unenrolled device 110 needs. For example, the enrollment server 160, or another server or a database the enrollment server 160 has access to, can store a table that maps group IDs to assigned commands, applications, and other resources. The enrollment server 160 can use the table to create a list of resources 150 that the unenrolled device 110 needs for enrollment.

At stage 306, the enrollment server 160 can send a resource list to the unenrolled device 110. In one example, the enrollment server 160 can send the list as a data file, such as an HTML, XML file, or a JSON file. In another example, the enrollment server 160 can send the resource list using an API call with the management application 140. In one example, the resources 150 can include applications, scripts, and configuration profiles. In another example, the enrollment server 160 can send the group ID of groups that the unenrolled device 110 is assigned to.

At stage 308, the unenrolled device 110 can send its group ID to the notification server 170. For example, the unenrolled device 110 can receive a URL for the notification server 170 from the enrollment server 160. The unenrolled device 110 can make an HTTP or API call to the notification server that includes the group ID. In one example, the group ID can be sent by a notification service associated with the management application 140.

At stage 310, the notification server 170 can identify enrolled devices 120 assigned to the group ID. For example, the notification server 170 can have access to a table that maps enrolled devices 120 to their group IDs and includes network information, such as their IP address and subnet, that gets updated regularly. In another example, the table can store arrays of network information where each array corresponds to a different group ID. The notification server 170 can identify the enrolled devices 120 assigned to the same group as the unenrolled device 110 and create a list that includes their network information.

In one example, the network information array for a group can include the network information for enrolled devices 120 assigned to a parent group of the group of the unenrolled device 110. This can occur, for example, where the parent group is assigned at least all the resources 150 assigned to the child group, and the parent enrolled devices 120 can therefore provide all the resources 150 needed by the unenrolled device 110.

At stage 312, the notification server 170 can send a list of the identified enrolled devices 120 to the unenrolled device 110. The notification server 170 can send the list as a notification or other data file type that the management application 140 listens for. In another example, the notification server 170 can encrypt the list, such as with a cryptographic hash using the group ID as the key.

At stage 314, the unenrolled device 110 can send a resource request to one of the identified enrolled devices 120. For example, the unenrolled device 110 can request the resources 150 from the first enrolled device 120 on the list. The request can include a list of resources 150. In one example, the resources 150 in the list can be hashed using a key, such as with the group ID.

At stage 316, the enrolled device 120 can send the requested resources 150 to the unenrolled device 110. In one example, the enrolled device 120 can send the resources 150 as individual files. In another example, the enrolled device 120 can encrypt the files, such as with a symmetric key, asymmetric key, or cryptographic hash. The unenrolled device 110 can decrypt the files and use the encryption method to verify them. In some examples, the enrolled device 120 can notify the unenrolled device 110 if any of the requested resources 150 is not updated at the enrolled device 120. The enrolled device 120 can also notify the unenrolled device 110 of any resources 150 from the list that it does not possess. In such examples, the unenrolled device 110 can send a request to the second enrolled device 120 on the list for the resources 150 that the first enrolled device 120 is unable to provide.

Figure 4:
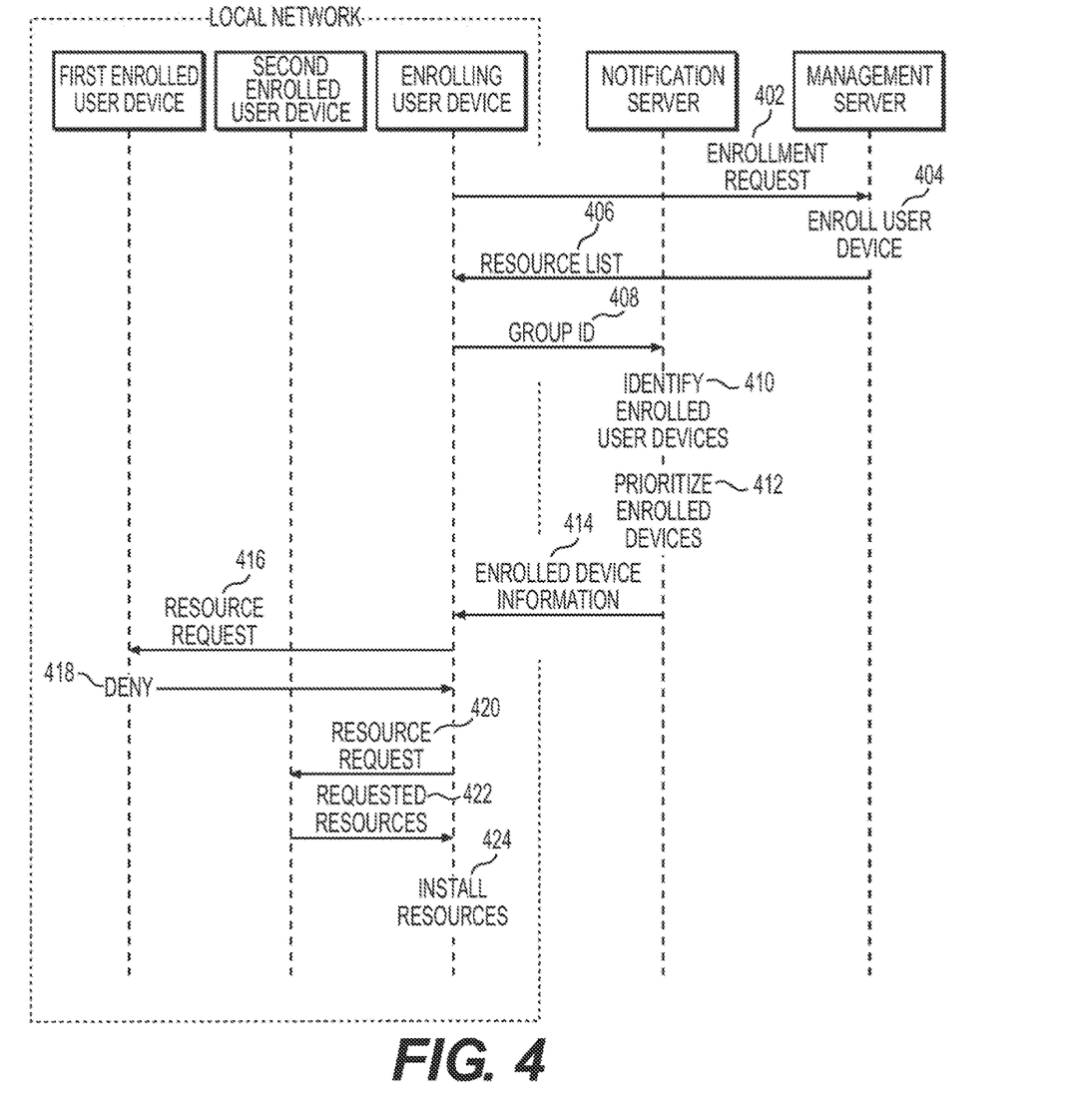
FIG. 4 is another sequence diagram of an example method for performing peer-to-peer software distribution.

FIG. 4 is another sequence diagram of an example method for performing peer-to-peer software distribution. At stage 402, the unenrolled device 110 can request enrollment from the enrollment server 160. In an example, enrollment can be facilitated on the unenrolled device 110 by the management application 140. For example, the user can launch the management application 140 on the unenrolled device 110 and the management application 140 can prompt the user to enter enrollment credentials. The user can enter the credentials, which can include the user's organization email address. The management application 140 can then cause the unenrolled device 110 to send an enrollment request to the enrollment server 160, and the enrollment request can include the credentials.

At stage 404, the enrollment server 160 can enroll the unenrolled device 110. In one example, this can include authenticating the user's credentials. The enrollment server 160 can also determine a group ID associated with the user's profile. The group ID can be one or multiple IDs that correspond to groups within the organization that the user is assigned to. The enrollment server 160 can use the group ID to identify resources 150 the unenrolled device 110 needs. For example, the enrollment server 160, or another server or a database the enrollment server 160 has access to, can store a table that maps group IDs to assigned commands, applications, and other resources. The enrollment server 160 can use the table to create a list of resources 150 that the unenrolled device 110 needs for enrollment. Technically, the unenrolled device 110 may be considered enrolled at this point, in an example. However, for convenience of discussion, this description refers to the device 110 as unenrolled until all resources 150 are installed.

At stage 406, the enrollment server 160 can send a resource list to the unenrolled device 110. In one example, the enrollment server 160 can send the list as a data file, such as an HTML, XML file, or a JSON file. In another example, the enrollment server 160 can send the resource list using an API call with the management application 140. In one example, f. In another example, the enrollment server 160 can send the group ID of groups that the unenrolled device 110 is assigned to.

At stage 408, the unenrolled device 110 can send its group ID to the notification server 170. For example, the unenrolled device 110 can receive a URL for the notification server 170 from the enrollment server 160. The unenrolled device 110 can make an HTTP or API call to the notification server that includes the group ID. In one example, the group ID can be sent by a notification service associated with the management application 140.

At stage 410, the notification server 170 can identify enrolled devices 120 assigned to the group ID. For example, the notification server 170 can have access to a table that maps enrolled devices 120 to their group IDs and includes network information, such as their IP address and subnet, that gets updated regularly. In another example, the table can store arrays of network information where each array corresponds to a different group ID. The notification server 170 can identify the enrolled devices 120 assigned to the same group as the unenrolled device 110 and create a list that includes their network information.

In one example, the network information array for a group can include the network information for enrolled devices 120 assigned to a parent group of the group of the unenrolled device 110. This can occur, for example, where the parent group is assigned at least all the resources 150 assigned to the child group, and the parent enrolled devices 120 can therefore provide all the resources 150 needed by the unenrolled device 110.

At stage 412, the notification server 170 can prioritize the identified enrolled devices 120. In an example, the prioritization can be determined based on a set of factors. The factors can be based on characteristics that may influence the ability of an enrolled user device 120 to provide the resources 150 to the unenrolled device 110. As some examples, the factors can be based on the number of resource requests already being executed by an enrolled device 120, available computing resources at the enrolled devices 120, the subnet of the enrolled device 120, and the number of resources 150 from the resource list that the enrolled device 120 possesses.

In an example, the enrolled devices 120 can calculate a prioritization score based on the factors. For example, points can be assigned to factors described above, like the number of resource requests already being executed, the subnet of the enrolled device, any of the computing resource categories, the number of requested resources 150 the enrolled device 120 possesses, and any other factor deemed relevant. In one example, factors can be weighted based on their determined impact. For example, the number of available resources 150 can be given a higher weight than battery percentage. An administrator can set the categories, scoring methods, and weights, in an example.

In an example, the enrolled devices 120 can be configured to send a prioritization score regularly, on a schedule, or upon request from the notification server 170. The enrolled devices 120 can also send their IP address and subnet, as well as any other required network information, to the notification server 170 with the prioritization score. Some information used to calculate a prioritization score is subject to sudden and frequent change, such as the information related to computing resources. For this reason, the notification server 170 can weight the scores based on how recently the prioritization score was received.

At stage 414, the notification server 170 can send an ordered list of the identified enrolled devices 120 and network information of the identified enrolled devices 120. In one example, the list can be an array that includes sets of network information for each enrolled device 120. For example, the list can include ordered pairs of the IP address and subnet for the enrolled devices in order of their priority.

At stage 416, the unenrolled device 110 can send a resource request to the first enrolled device 120a. The unenrolled device 110 can send the request using an HTTP request or API call, as some examples. In one example, the request can include a file, such as an XML file or JSON file. In another example, the file can include a list of hashes that correspond to the resources 150 the unenrolled device 110 is requesting. In another example, the resources 150 in the list can be hashed using the group ID as the hash key. The first enrolled device 120a, which is assigned to the same group ID, can use the group ID to decrypt the hashed items in the list.

At stage 418, the first enrolled device 120a can deny the request. For example, the first enrolled device 120a can perform a check to determine whether it can send the requested resources. The first enrolled device 120a can be configured to deny a resource request for various reasons. For example, the enrolled devices 120 can be configured to limit the number of resource requests it can execute simultaneously or deny resource requests where computing resource parameters exceed a threshold. The first enrolled device 120a can therefore deny the request if it is handling the maximum number of allowed resource requests.

In another example, the unenrolled device 110 can deny the request if its available upload bandwidth drops below a predetermined threshold. For example, if the network connection of the first enrolled device 120a suddenly weakens or the first enrolled device 120a begins uploading a large file, the upload bandwidth of the enrolled device 120 may be limited. The first enrolled device 120a can be configured to deny the request because another enrolled device 120 can send the resources 150 at a much faster transfer rate or because accepting the request will overly burden the first enrolled device 120a.

At stage 420, the unenrolled device 110 can send a resource request to the second enrolled device 120b. In an example, this stage can happen as described above regarding stage 416. In one example, the unenrolled device 110 can also send a counter indicating how many times its resource requests have been denied. For example, the enrolled devices 120 can be configured to override certain request denial factors if a requesting unenrolled device 110 has reached a threshold number of denials. This can help ensure that the unenrolled device 110 is able to retrieve the resources 150 it needs to complete enrollment.

At stage 422, the second enrolled device 120b can send the requested resources 150 to the unenrolled device 110. In one example, the second enrolled device 120b can send the resources 150 as individual files. In another example, the second enrolled device 120b can encrypt the files, such as with a symmetric key, asymmetric key, or cryptographic hash. The unenrolled device 110 can decrypt the files and use the encryption method to verify them.

At stage 424, the unenrolled device 110 can install the resources 150. For example, the unenrolled device can install applications from installation files, install configuration files, and store other data files.

In some examples, the method can continue if the second enrolled device 120b does not possess all the requested resources 150 or if one or more of the requested resources 150 is not up to date at the second enrolled device 120b. In these examples, the second enrolled device 120b can notify the unenrolled device 110 of any such resources 150. The unenrolled device 110 can then requested the remaining resources 150 from the third enrolled device 120c on the list. The unenrolled device 110 can continue down the list until it is able to obtain all the resources 150 from the list. In one example, the after a predetermined amount of time or request attempts, the unenrolled device 110 can be configured to contact a content delivery server that can provide the requested resources 150. This can be used as a last resort to minimize the computing resources needed at the server level.

Figure 5:
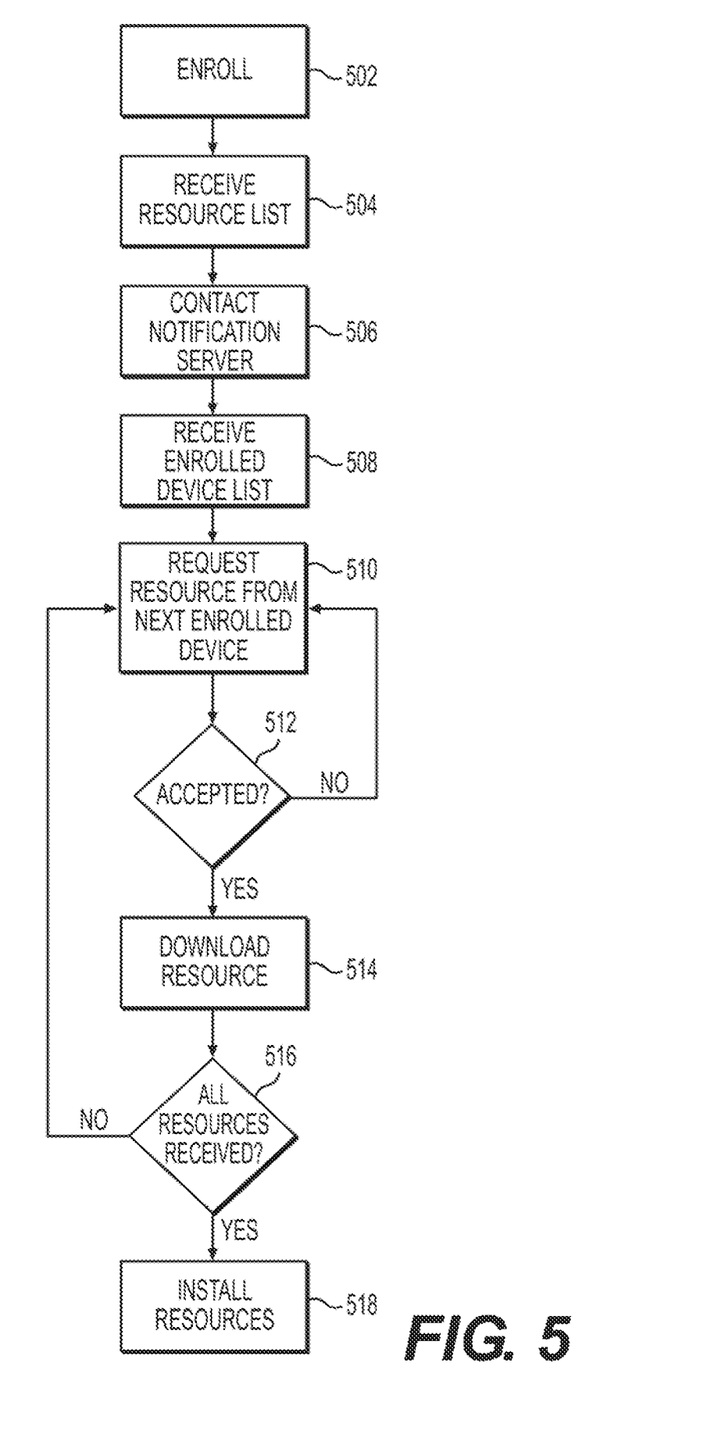
FIG. 5 is another flowchart of an example method for peer-to-peer software distribution.

FIG. 5 is another flowchart of an example method for peer-to-peer software distribution. The example method of FIG. 5 illustrates stages performed by the unenrolled device 110 to retrieve resources 150 from already enrolled devices 120 when enrolling with the UEM system 190. At stage 502, the unenrolled device 110 can enroll with the enrollment server 160. For example, the user can input credentials into the management application 140, and the management application 140 can send the credentials in an enrollment request to the enrollment server 160. As mentioned before, even if the unenrolled device 110 is technically enrolled after stage 502, it is still referred to as an unenrolled device 110 until resources are installed at stage 518 for purposes of this description.

At stage 504, the unenrolled device 110 can receive a list of resources 150 from the enrollment server 160. For example, the enrollment server 160 can identify one or more group IDs for groups that the user is assigned to based on the user credentials. The enrollment server 160 can then send a list of resources 150 that the unenrolled device 110 needs based on the group ID.

At stage 506, the unenrolled device 110 can contact the notification server 170. In an example, the unenrolled device 110 can send the group ID to the notification server 170, and the notification server can identify enrolled devices 120 that are assigned to the same group. The notification server 170 can create or retrieve a list that includes network information for the identified enrolled devices 120, and at stage 508 the notification server 170 can send the network information to the unenrolled device 110. In some examples, the network information can be an ordered list that prioritizes the enrolled devices 120 based on predetermined criteria.

At stage 510, the unenrolled device 110 can request resources 150 on the resource list from a first enrolled device 120a from the device list. For example, the unenrolled device 110 can send a request to the IP address in the list, and the request can include the list of resources 150. In one example, the unenrolled device 110 can send the request to a specific connection report that enrolled devices 120 are configured to listen to for such requests.

At stage 512, if the first enrolled device 120a rejects the request, the method can return to stage 510 where the unenrolled device 110 sends a resource request to the next enrolled device 120 on the list. The unenrolled device 110 can continue to cycle through stages 510 and 512 until an enrolled device 120 accepts the request. Once a request is accepted at stage 512, the unenrolled device 110 can proceed to download the resources 150 at stage 514. For example, if the first enrolled device 120a rejects the request and a second enrolled device 120b accepts the request, the unenrolled device 110 can download resources 150 from the second enrolled device 120b.

After downloading the resources 150 at stage 514, the unenrolled device 110 can determine whether it has received all the resources 150 from the resource list at stage 516. For example, if the second enrolled device 120b can provide some, but not all, the resources 150, the method can return to stage 510 where the unenrolled device 110 can send a resource request to a third enrolled device 120c from the device list. The method can then proceed as before, returning to stage 510 whenever an enrolled device 120 rejects a resource request or the unenrolled device 110 downloads one or more resources 150 but has not yet received all the resources 150 from the list.

Finally, where the unenrolled device 110 determines that it has downloaded all the resources 150 from the resource list at stage 516, the method can proceed to stage 518 where the unenrolled device 110 installs the resources 150. For example, the unenrolled device 110 can install application files, configuration profiles, and any other file types from the resources 150. In one example, the unenrolled device 110 can install resources 150 as they are received, so the unenrolled devices 110 can install some resources 150 while it attempts to retrieve others.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for performing peer-to-peer software distribution in a Unified Endpoint Management ("UEM") system, comprising:
   sending, by an unenrolled user device that is not enrolled with the UEM system, an enrollment request to a UEM server, wherein enrollment grants administrative access of the unenrolled user device to the UEM server;
   receiving, by the unenrolled user device, a list of resources from the UEM server, wherein the resources in the list are based on a group that the unenrolled device is assigned to in the UEM system;
   receiving, by the unenrolled user device, network information of enrolled user devices assigned to the group;
   requesting, by the unenrolled user device, the resources from a first enrolled user device of the enrolled user devices using the network information; and
   in an instance where the first enrolled user device rejects the resource request:
      adding a number to a counter that indicates a number of rejected resource requests by the unenrolled user device;
      requesting, by the unenrolled user device, the resources from a second enrolled user device of the enrolled user devices using the network information, wherein the request includes the counter number; and
      receiving, from the first enrolled user device, the requested resources.

2. The method of claim 1, wherein, in an instance where the first enrolled user device includes an outdated version of a first resource from the resource list, the unenrolled device receives, from the first enrolled user device, resources from the resource list having current versions, and wherein the method further comprises:
   requesting, by the unenrolled user device and from a third enrolled user device, the first resource; and
   in an instance where the third user device includes a current version of the first resource;
   receiving from the third user device, the current version of the first resource.

3. The method of claim 1, wherein the network information received by the unenrolled user device is formatted as a prioritized list based on a priority score assigned to each of the enrolled user devices.

4. The method of claim 3, wherein the priority score for each enrolled user device is based on at least one of a number of resource requests being executed, available central processing unit power, available network bandwidth, available memory, remaining battery power, and a subnet of the enrolled user device.

5. The method of claim 1, wherein the network information received by the unenrolled device is the network information of a first subset of enrolled user devices assigned to the group.

6. The method of claim 5, wherein, in an instance where the all the enrolled user devices in the first subset reject the resource request of the unenrolled device, the method further comprises receiving, by the unenrolled device, network information for a second subset of enrolled user devices.

7. A non-transitory, computer-readable medium containing instructions that are executed by a hardware-based processor to perform stages for performing peer-to-peer software distribution in a Unified Endpoint Management ("UEM") system, the stages comprising:
sending, by an unenrolled user device that is not enrolled with the UEM system, an enrollment request to a UEM server, wherein enrollment grants administrative access of the unenrolled user device to the UEM server;
receiving, by the unenrolled user device, a list of resources from the UEM server, wherein the resources in the list are based on a group that the unenrolled device is assigned to in the UEM system;
receiving, by the unenrolled user device, network information of enrolled user devices assigned to the group;
requesting, by the unenrolled user device, the resources from a first enrolled user device of the enrolled user devices using the network information; and
in an instance where the first enrolled user device rejects the resource request:
adding a number to a counter that indicates a number of rejected resource requests by the unenrolled user device;
requesting, by the unenrolled user device, the resources from a second enrolled user device of the enrolled user devices using the network information, wherein the request includes the counter number; and
receiving, from the first enrolled user device, the requested resources.

8. The non-transitory, computer-readable medium of claim 7, wherein, in an instance where the first enrolled user device includes an outdated version of a first resource from the resource list, the unenrolled device receives, from the first enrolled user device, resources from the resource list having current versions, and wherein the stages further comprise:
requesting, by the unenrolled user device and from a third enrolled user device, the first resource; and
in an instance where the third user device includes a current version of the first resource;
receiving from the third user device, the current version of the first resource.

9. The non-transitory, computer-readable medium of claim 7, wherein the network information received by the unenrolled user device is formatted as a prioritized list based on a priority score assigned to each of the enrolled user devices.

10. The non-transitory, computer-readable medium of claim 7, wherein the priority score for each enrolled user device is based on at least one of a number of resource requests being executed, available central processing unit power, available network bandwidth, available memory, remaining battery power, and a subnet of the enrolled user device.

11. The non-transitory, computer-readable medium of claim 7, wherein the network information received by the unenrolled device is the network information of a first subset of enrolled user devices assigned to the group.

12. The non-transitory, computer-readable medium of claim 11, wherein, in an instance where the all the enrolled user devices in the first subset reject the resource request of the unenrolled device, the method further comprises receiving, by the unenrolled device, network information for a second subset of enrolled user devices.

13. A system for performing peer-to-peer software distribution in a Unified Endpoint Management ("UEM") system, comprising:
a memory storage including a non-transitory, computer-readable medium comprising instructions; and
a computing device including a hardware-based processor that executes the instructions to carry out stages comprising:
sending, by an unenrolled user device that is not enrolled with the UEM system, an enrollment request to a UEM server, wherein enrollment grants administrative access of the unenrolled user device to the UEM server;
receiving, by the unenrolled user device, a list of resources from the UEM server, wherein the resources in the list are based on a group that the unenrolled device is assigned to in the UEM system;
receiving, by the unenrolled user device, network information of enrolled user devices assigned to the group;
requesting, by the unenrolled user device, the resources from a first enrolled user device of the enrolled user devices using the network information; and
receiving, from the first enrolled user device, the requested resources, wherein, in an instance where the first enrolled user device includes an outdated version of a first resource from the resource list, the unenrolled device receives, from the first enrolled user device, resources from the resource list having current versions, and
wherein the stages further comprise:
requesting, by the unenrolled user device and from a third enrolled user device, the first resource; and
in an instance where the third user device includes a current version of the first resource, receiving, from the third user device, the current version of the first resource.

14. The system of claim 13, wherein, in an instance where the first enrolled user device rejects the resource request, the stages further comprising:
adding a number to a counter that indicates a number of rejected resource requests by the unenrolled user device;
requesting, by the unenrolled user device, the resources from a second enrolled user device of the enrolled user devices using the network information, wherein the request includes the counter number; and
receiving, from the first enrolled user device, the requested resources.

15. The system of claim 13, wherein the network information received by the unenrolled device is the network information of a first subset of enrolled user devices assigned to the group.

16. The system of claim 13, wherein the network information received by the unenrolled user device is formatted as a prioritized list based on a priority score assigned to each of the enrolled user devices.

17. The system of claim 16, wherein the priority score for each enrolled user device is based on at least one of a number of resource requests being executed, available central processing unit power, available network bandwidth, available memory, remaining battery power, and a subnet of the enrolled user device.

* * * * *